United States Patent [19]
Fontaine

[11] 3,790,223
[45] Feb. 5, 1974

[54] CONTROL SYSTEM FOR BRAKES
[76] Inventor: John G. Fontaine, 4119 N.E. 6th Ave., Fort Lauderdale, Fla. 33308
[22] Filed: Sept. 26, 1972
[21] Appl. No.: 292,282

[52] U.S. Cl................. 303/19, 91/459, 180/101, 180/111
[51] Int. Cl............................................... B60t 7/14
[58] Field of Search.... 303/19, 18, 31, 2, 3; 180/99, 180/101, 111–113, 82 C; 60/54.5 P, 54.6 P, DIG. 2; 188/356, 109; 92/63–64, 101, 48; 91/404, 459

[56] References Cited
UNITED STATES PATENTS

| | | | |
|---|---|---|---|
| 3,612,619 | 10/1971 | Hayes | 303/18 |
| 2,296,003 | 9/1942 | Loo | 180/99 |
| 3,487,451 | 12/1969 | Fontaine | 303/19 |
| 3,433,132 | 3/1969 | James | 92/48 |
| 3,451,501 | 6/1969 | Applegate | 180/99 |

*Primary Examiner*—Duane A. Reger
*Assistant Examiner*—D. C. Butler
*Attorney, Agent, or Firm*—Oltman & Flynn

[57] ABSTRACT

A control system for controlling the brakes of a motor vehicle including a seat switch for incorporation in the driver's seat of the vehicle, a second switch to be controlled by another function of the vehicle, and a solenoid valve to control a vacuum circuit. The two switches and the coil of the solenoid valve are connected to the battery of the vehicle so that the coil is energized when both switches close and deenergized when either of the switches opens. A vacuum operated metering valve and the solenoid valve are connected in a vacuum circuit with a vacuum source such that deenergization of the coil of the solenoid valve in response to opening of either or both of the switches operates the solenoid valve and the metering valve to apply the main brakes of the vehicle. Thus, if the driver of the vehicle should leave his seat, the brakes are automatically applied. Likewise, if the other predetermined function causes the second switch to be actuated, the brakes are automaticaly applied. This function might be the opening of a door, such as the door of a school bus, or the removal of a nozzle from its cradle on a gas or gasoline truck, by way of example.

12 Claims, 3 Drawing Figures

3,790,223

CONTROL SYSTEM FOR BRAKES

BACKGROUND OF THE INVENTION

It is generally known how a hand controlled metering valve functions on vehicles equipped with vacuum brakes. A typical hand valve is mounted on the steering column just below the steering wheel and has a range of movement of six inches or so. When the hand valve handle is in its upper position, the vacuum is closed, and as the handle of the valve is gradually moved down, atmosphere is introduced into the system causing the brakes to apply with greater and greater force. A typical vacuum controlled brake system where a hand valve is in use is usually the type referred to as a vacuum suspended booster brake. When atmosphere is introduced into one end of the booster brake without diminishing the vacuum on the other end of the booster brake, the piston within the cylinder, which is usually the diaphragm type, will move in one direction.

Therefore, a hand valve is for the purpose of metering the amount of atmosphere introduced into the system to cause the brakes to apply to the desired amount of pressure as determined by the driver. When the handle on the valve is moved from zero to maximum, the handle moves approximately 6 inches. However, the design of the typical hand valve is such that when the handle of the valve is moved through the full range, the piston in the metering valve moves about three-eighths eights to one-half inch. It is apparent that if the driver could only move the hand valve three-eighths eights to one-half inch from the zero position to the maximum braking position, the driver would experience extreme difficulty in manipulating the system to apply the brakes to the desired degree.

The control system of the present invention automatically operates a metering valve for vacuum brakes to a desired degree so that the brakes of a vehicle are applied automatically to bring the vehicle to a safe, controlled stop. In such an automatic system, the brakes of the vehicle should always apply with a safe force, so the metering valve of the control system should be adjustable to control the braking force, taking into account the weight of the vehicle. The control system is capable of automatically applying the brakes of the vehicle in response to the occurrence of predetermined conditions. One of these conditions is the opening of a seat switch which may be similar to that disclosed in U.S. Pat. No. 3,487,451 of the present inventor. One or more additional switches may be utilized to apply the brakes responsive to the occurrence of another condition, such as the opening of a door of a school bus, or the removal of a gas pumping hose from its cradle on a gas delivery truck.

SUMMARY OF THE INVENTION

The control system of the present invention applies the brakes of a motor vehicle automatically when either or both of two switches is actuated. As previously mentioned, one of these switches is actuated when the driver of the vehicle leaves the driver's seat. The other switch is activated on occurrence of one of any of several possible functions, such as the opening of a door or the removal of a gas pumping nozzle from a cradle as mentioned above. The control system also includes a solenoid valve which is connected w9th the two switches to a battery of the vehicle for controlling a vacuum circuit. A vacuum operated metering valve controls air pressure supplied to the main brakes of the motor vehicle. The solenoid valve and the metering valve are connected in a vacuum circuit with a vacuum source so that activation of the solenoid valve coil in response to actuation of either or both of the switches operates the solenoid valve and the metering valve to apply the main brakes of the vehicle.

Accordingly, one of the objects of the present invention is to provide a mechanism that will automatically apply the brakes on vehicles equipped with vacuum power brakes when the driver is out of the driver's seat, a door is opened, or when other contacts are broken.

Another object of the invention is to provide an automatic metering valve mechanism that can readily be adjusted, taking into account the weight of the vehicle, and which will permit the brakes to apply with a predetermined force, such that in the event of an emergency, the vehicle will be brought to a safe, controlled stop.

Yet another object of the invention is to provide a simple attachment that is easily connected to the existing power brake mechanism already on the vehicle as part of the original equipment when manufactured.

A further object of the invention is to provide therewith a safety seat switch, not unlike that found in my U.S. Pat. No. 3,487,451, and other normally open switches that will find placement in connection with the door of school buses, causing the said school bus to remain stationary while children are entering and leaving the bus, and will only move when the door is fully closed.

One last object of the invention is to provide a means, fail safe in nature, that will cause brake application in the event of an open contact or loss of electrical energy caused by removal of the retractable hose mechanisms found on fuel or propane gas delivery trucks.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
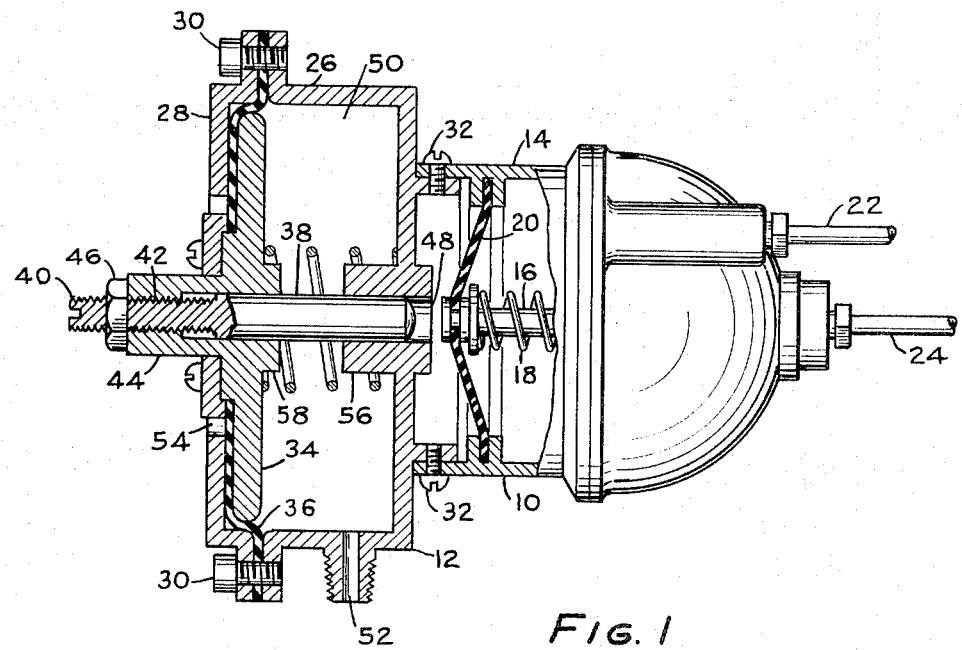
FIG. 1 is a sectional view of a vacuum operated metering valve.
Figure 2:
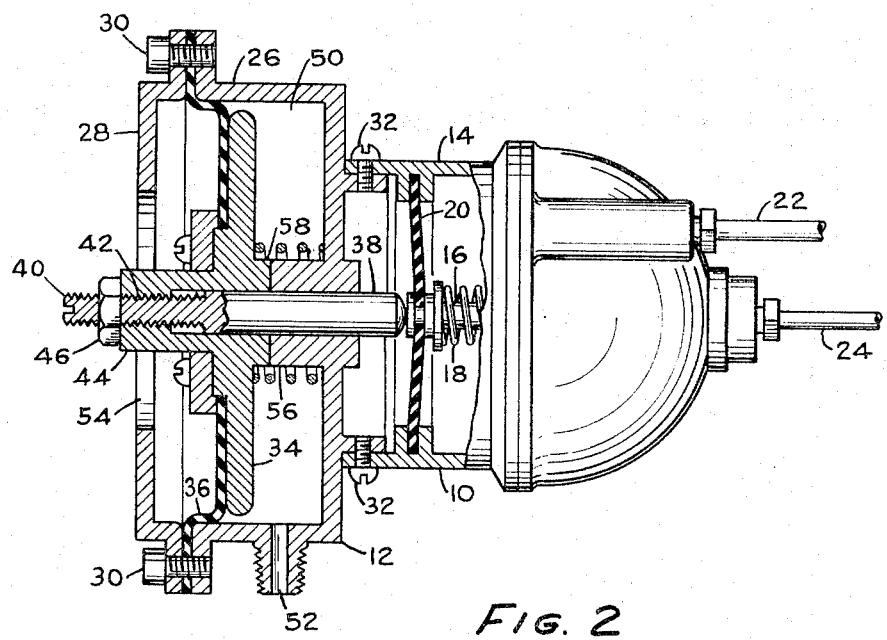
FIG. 2 is a sectional view of the vacuum operated metering valve of FIG. 1 in an actuated condition.

FIGS. 1 and 2 illustrate a metering valve which is utilized in the control system of the invention. The metering valve 10 includes an actuator 12 which is vacuum operated. The valve 10 also includes a housing 14 in which a plunger 16 reciprocates, the plunger 16 being biased to a rest position shown in FIG. 1 by a spring 18. The plunger 16 is piston operated, the piston in this embodiment being a diaphragm 20 connected at its center to the plunger 18 and connected at its periphery to the housing 14. The valve housing 14 is connected to the vacuum brakes of a motor vehicle by conduits 22 and 24. The plunger 16 operates a valve element (not shown) which controls the pressure of air in the conduits 22 and 24. In the illustrated embodiment, when the plunger 16 is at the rest position shown in FIG. 1, vacuum is held in conduit 22 to keep the brakes from being applied. When the plunger 16 shifts to the right as shown in FIG. 2 in response to operation of the actuator 12, atmospheric pressure is supplied through conduit 24 to increase the pressure on one side of the brake piston so that this pressure aided by the vacuum existing on the other side of the brake piston causes the brakes to be applied.

The actuator 12 includes a housing 26 with a cover 28 secured to the housing 26 as by bolts 30. The housing 26 is also attached to the housing 14 of the main valve as with screws 32. The actuator 12 has a piston 34 which may be supplemented by a diaphragm 36 connected between the piston 34 and the housing 26. A plunger 38 has threads 40 which screw into matching threads 42 in a shank 44 of the piston 34, and the position of the plunger 38 is adjustable by rotation. A lock nut 46 locks the plunger in a given position of adjustment. The plunger 38 extends through an opening 48 at the bottom of the housing 26, and the plunger is adapted to contact the end of the plunger 16 of the main valve 10. The chamber 50 at the right of the piston 34 has an inlet 52 which is adapted to be connected to a vacuum line for applying vacuum to chamber 50. The other side of the piston 34 is vented to the atmosphere through a vent opening 54. When vacuum is applied to the chamber 50, the piston 34 and diaphragm 36 move to the right causing the plunger 38 to contact the plunger 16 and operate the valve 10 to apply the brakes of the motor vehicle in accordance with the previous description. The housing 26 of actuator 12 has a stop 56 which is contacted by an abutment 58 on the piston 34 when the actuator is fully operated. Thus, the actuator will cause the valve 10 to apply the same pressure to the brakes of the vehicle each time the valve is operated. This pressure is adjusted by rotating the plunger 38 to determine the position of that plunger and also the plunger 16 when the valve is fully operated. The adjustment of plunger 38 is made taking into account the weight of the vehicle.

Figure 3:
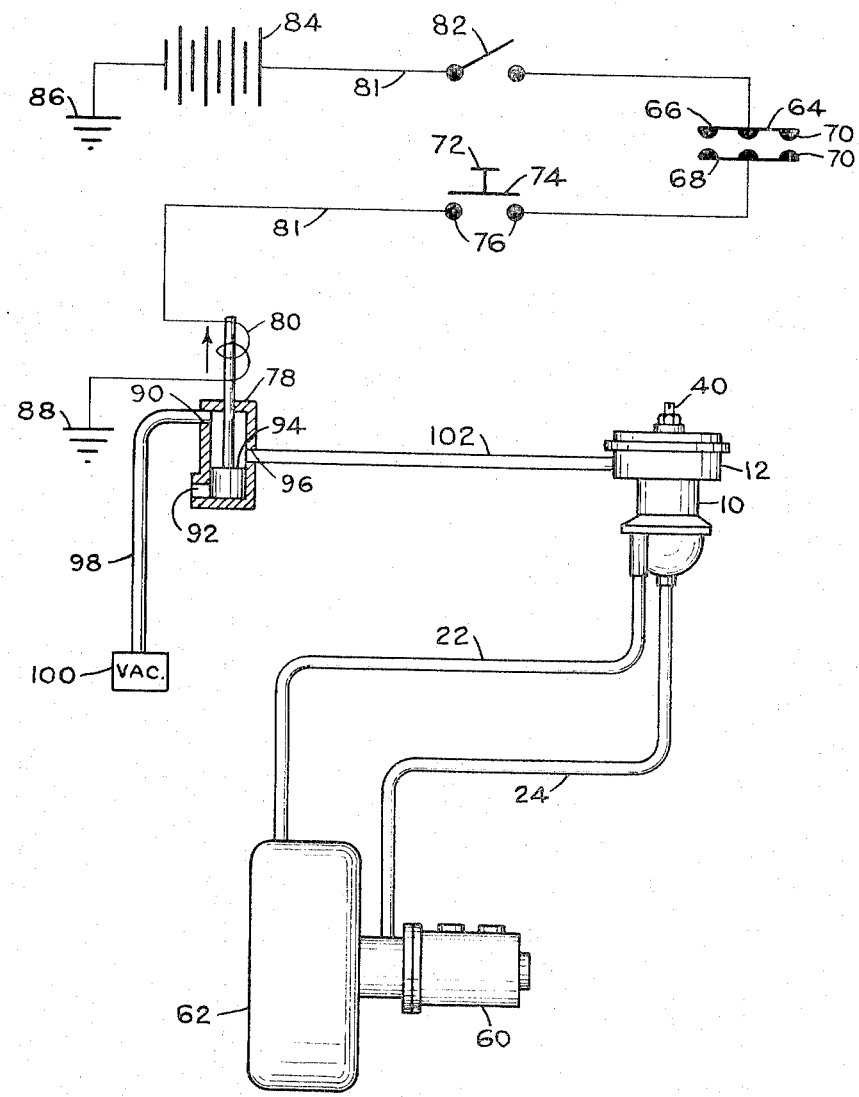
FIG. 3 is a schematic diagram of a control system in accordance with the invention.

Referring now to FIG. 3, the vacuum operated metering valve 10 with its actuator 12 is shown connected by conduits 22 and 24 to vacuum operated brakes 60 of a motor vehicle. A vacuum booster 62 has a piston which causes the brakes to release and apply. When atmospheric pressure is introduced through conduit 24, the brakes are applied.

The control system of FIG. 3 also includes a seat switch 64 adapted to be incorporated in the driver's seat of a vehicle. The seat switch is normally open, but it has contacts which are closed when the driver of the vehicle sits on the seat. The switch 64 includes two sheets 66 and 68, and at least one of these sheets, and preferably both sheets, have a plurality of point contacts 70 distributed over the area of the sheets. Thus, when the driver sits on the seat, at least one, and ordinarily several of the contacts 70 will close. A compressible, insulating separator is provided between the sheets 64, and it has apertures through which the contacts 70 close. The separator is resilient, and so tends to keep the sheets 66 and 68 separated until the driver sits on the seat.

The control system includes another normally open switch 72 which has a movable contact 74 and fixed contacts 76. The switch is adapted to be operated in response to a predetermined function of the motor vehicle. This function may be the opening of a door of the vehicle, particularly in the case of a school bus. When the door of a school bus opens, the brakes should be applied, and the control system of the invention will accomplish this function. Alternatively, the switch 72 might be installed at the cradle of a gas or gasoline delivery hose of a fuel truck such that the switch closes when the nozzle for the hose of the truck is in the cradle and opens when the nozzle is removed. It has happened on some occasions that while fuel is being pumped into an airplane or the like, the fuel truck has been driven away causing considerable damage. The switch 72, if installed properly in the cradle of such a fuel truck, would open when the nozzle is out of the cradle, thus applying the brakes of the truck to prevent it from being driven away until the nozzle is replaced in the cradle.

The control system of FIG. 3 also includes a solenoid valve 78 having a coil 80 for operating the valve to control a vacuum circuit. The coil 80, the switch 72 and the switch 64 are connected by line 81 in series with each other and in series with an ignition switch 82 to the battery 84 of the motor vehicle. The battery 84 is grounded at 86, and the coil 80 is grounded at 88.

The solenoid valve 78 has a vacuum inlet 90 and an atmosphere inlet 92. The solenoid valve 78 is shown with its piston 94 in its normal position where it closes the atmosphere inlet 92 and leaves the vacuum inlet 90 open. The valve 78 also has an outlet 96.

In the control system of FIG. 3, the vacuum inlet 90 is connected by a conduit 98 to a vacuum source 100 which is also installed in the motor vehicle. The atmosphere inlet 92 is left vented to the atmosphere. The outlet 96 is connected by a conduit 102 to the vacuum inlet 52 (FIG. 1) of the actuator 12 of the metering valve 10. Thus, the solenoid valve 78 and the metering valve 10 are connected in a vacuum circuit with the vacuum source 100.

In operation, activation of the coil 80 of the solenoid valve 78 in response to actuation of either or both of the switches 72 and 64 operates the solenoid valve 78 and the metering valve 10 to apply the brakes 60 of the motor vehicle. The ignition switch is closed when the vehicle is started. The switch 64 is closed when the driver sits on the driver's seat of the vehicle. The other switch 72 is also closed when the vehicle is being driven. Thus, when the vehicle is operating, the electrical circuit 81 is completed to energize the coil 80 shifting the piston 94 up so that the vacuum inlet 90 is closed and the atmosphere inlet 92 is opened. This keeps the metering valve 10 deactivated so that the brakes do not apply.

If either the switch 72 or the switch 64 should open (or the ignition switch 82 should open), the electrical circuit 81 is interrupted. This causes the coil 80 to be deenergized to allow the piston 94 to shift to the position shown in FIG. 3. Vacuum is then applied from the source 100 to the inlet 90, through the valve 78 to the outlet 96, and through conduit 102 to the inlet 52 of the actuator 12 of the metering valve 10. The application of vacuum to the actuator 12 causes the metering valve to operate in the manner described previously to apply the brakes of the vehicle. The vehicle then comes to a safe, controlled stop and remains there until all of the switches 82, 72 and 64 are again closed.

Thus, the invention provides a safety control system for the brakes of a motor vehicle, and particularly for vacuum operated brakes with external control valves. This system operates automatically, and causes the brakes to be applied with the same force each time. It is obvious that a relay can be inserted in the electrical system to provide for complete brake release with the ignition turned off. The application of the braking force can be adjusted by adjusting the plunger of the actuator for the metering valve of the system. The system includes electrical switches and a solenoid valve arranged with the metering valve to provide reliable and safe automatic operation of the brakes of the vehicle in certain situations.

Having thus described my invention, I claim:

1. A control system for controlling the main brakes of a motor vehicle having a battery and a vehicle function distinct from the brakes comprising:

a seat switch for incorporation in the driver's seat of the vehicle,
   a second switch to be controlled by said last-mentioned vehicle function,
   a solenoid valve having an electrical coil for operating the same to control a vacuum circuit,
   means for connecting said switches and said coil to the battery of the vehicle so that the energization of said coil is controlled by both of said switches,
   a metering valve to control fluid pressure supplied to the main brakes of the motor vehicle, said metering valve having a vacuum operated actuator controlling its operation,
   a vacuum source,
   and vacuum conduit means for connecting said solenoid valve and said metering valve actuator in a vacuum circuit with said source so that operation of said solenoid valve coil in response to operation of either or both of said switches operates said solenoid valve and said metering valve actuator for operating said metering valve to apply the main brakes of the vehicle.

2. The control system as claimed in claim 1 in which said vacuum operated actuator is adjustable and can be set to cause the brakes to apply with the same force each time.

3. The control system as claimed in claim 2 in which said actuator includes a piston and a plunger threadably connected together so that the adjustment of said plunger controls the force of the brakes.

4. The control system as claimed in claim 1 in which said switches are closed in the normal operation of the vehicle to energize said solenoid valve for venting said metering valve actuator through said solenoid valve to atmosphere to release the brakes, and the solenoid valve is operated by de-energization of said coil in response to opening of either or both of said switches to apply vacuum to said metering valve actuator and thus apply the brakes.

5. A control system for controlling the main brakes of a motor vehicle having a battery and vacuum operated brakes and another vehicle function comprising:

a normally open seat switch for incorporation in the driver's seat of the vehicle and adapted to be closed when the driver sits on the seat,
   a second normally open switch adapted to be closed by said other function of the vehicle,
   a solenoid valve having an electrical coil for operating the same to control a vacuum circuit,
   means for connecting said switches and said coil to the battery of the vehicle so that the energization of said coil is controlled by both of said switches,
   a metering valve to control pressure supplied to the vacuum brakes of the vehicle, said metering valve having a vacuum operated actuator controlling its operation,
   a vacuum source,
   and vacuum conduit means for connecting said solenoid valve and said metering valve actuator in a vacuum circuit with said source so that deenergization of said solenoid valve coil in response to opening of either or both of said switches operates said solenoid valve to supply vacuum to said metering valve actuator to in turn operate said metering valve to apply the brakes of the vehicle.

6. The control system as claimed in claim 5 in which said vacuum operated actuator is adjustable and can be set to cause the brakes to apply with the same force each time.

7. The control system as claimed in claim 6 in which said actuator includes a piston and a plunger threadably connected together so that the adjustment of said plunger controls the force of the brakes.

8. In a control system for fluid pressure-responsive vehicle brakes which has a metering valve for operating the brakes, the improvement which comprises:

a reciprocable actuator operable by a fluid pressure differential to operate said metering valve to apply the brakes;
   switch means on the vehicle for controlling the operation of said actuator;
   a stop for limiting the movement of said actuator in the direction in which it operates said metering valve to apply the brakes;
   and means for adjusting the extent of movement of said actuator in said direction to thereby determine its operation of said metering valve.

9. A control system according to claim 8, wherein said metering valve is opened to apply the brakes, and said stop limits the movement of the actuator in the direction in which it opens said metering valve.

10. A control system according to claim 9, wherein the vehicle brakes are vacuum operated, and said actuator is vacuum operated.

11. A control system according to claim 10, wherein said switch means comprises a driver's seat switch and a second switch on the vehicle connected so that either can cause the movement of the actuator in the direction in which it operates said metering valve.

12. A control system according to claim 10, and further comprising:

means connecting the side of said actuator that is away from said metering valve to the atmosphere;
   spring means biasing the actuator away from the metering valve;

and an electrically-operated valve having a fluid connection to the side of the actuator that is toward the metering valve, said electrically-operated valve being controlled by said switch means to connect said last-mentioned side of the actuator either to the atmosphere for movement of the actuator away from the metering valve by said spring means or to a vacuum source for movement of the actuator toward said metering valve to operate the latter to apply the brakes.

* * * * *